United States Patent

[11] 3,575,384

| [72] | Inventor | Richard H. Sachs<br>New Whiteland, Ind. |
|---|---|---|
| [21] | Appl. No. | 778,575 |
| [22] | Filed | Nov. 25, 1968 |
| [45] | Patented | Apr. 20, 1971 |
| [73] | Assignee | American Hoist & Derrick Co.<br>St. Paul, Minn. |

[54] ASPHALT WEIGHING AND PRESSURE INJECTION MIXING SYSTEM
5 Claims, 4 Drawing Figs.

[52] U.S. Cl............................................. 259/154
[51] Int. Cl.............................................. B28c 7/04
[50] Field of Search.................................. 259/154,
155, 156, 157, 164, 165, 168, 18, 36, 161, 162, 149, 148

[56] References Cited
UNITED STATES PATENTS

| 1,994,577 | 3/1935 | Eggert............... | 259/168 |
| 2,547,403 | 4/1951 | Madsen.............. | 259/154 |
| 3,148,866 | 9/1964 | Booth................. | 259/154 |

Primary Examiner—Robert W. Jenkins
Attorney—Woodard, Weikart, Emhardt & Naughton ABSTRACT: In an asphalt batch mix plant, asphalt is pressure injected from a plurality of nozzles along the centerline of the batch mixer. The nozzles are spaced along a spray bar mounted to an asphalt weigh bucket mounted on scales and equipped with power-operated inlet and outlet valves to admit and contain asphalt for weighing. An air supply is connected to the weigh bucket to establish a pressure therein for discharge of the weighed asphalt through the spray bar nozzles into the mixer.

Patented April 20, 1971

INVENTOR
RICHARD H. SACHS
BY
Woodard, Weikart, Emhardt & Naughton
Attorneys

Patented April 20, 1971
3,575,384
2 Sheets-Sheet 2
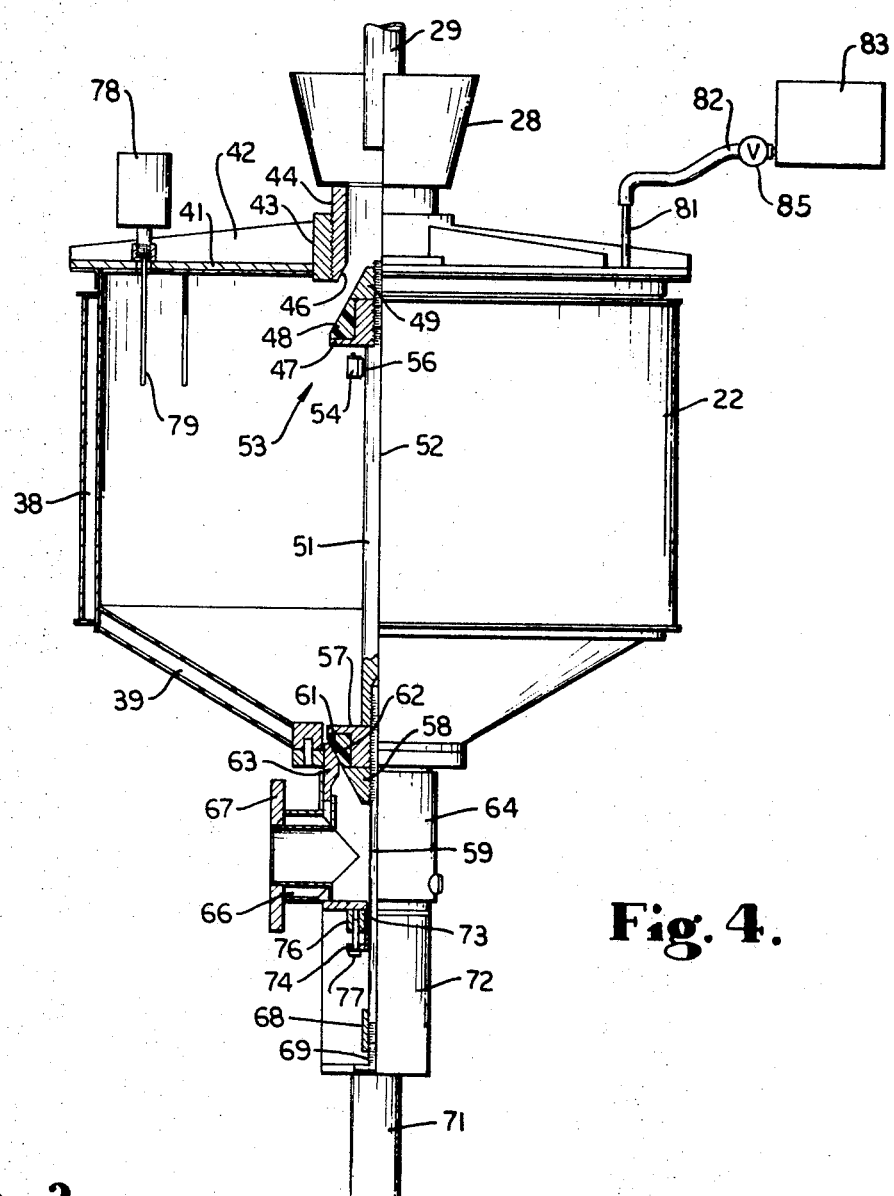
Fig. 4.
Fig. 2.
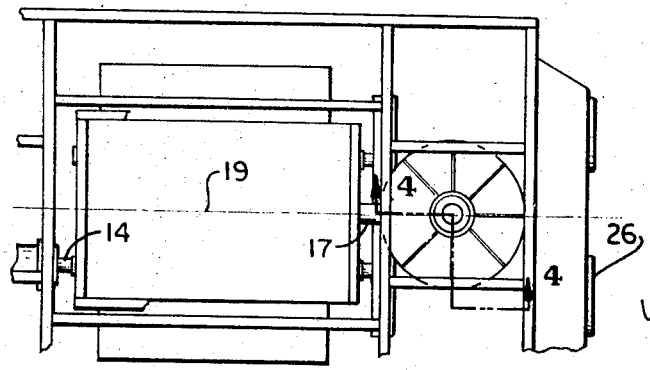
INVENTOR
RICHARD H. SACHS
BY
Woodard, Weikart, Emhardt & Naughton
Attorneys

ASPHALT WEIGHING AND PRESSURE INJECTION MIXING SYSTEM

BACKGROUND OF THE INVENTION

1. Field of the Invention

This invention relates generally to asphalt batch mix plants, and more particularly to a system for injection of known quantities of asphalt into aggregate in a mixer.

2. Description of the Prior Art

It is a well-known conventional practice to discharge asphalt from a weighing box or bucket into a mixer by gravity. This usually necessitates dumping the asphalt into the side of the mixer, because of the necessity for leaving room for the aggregate weighing bucket. Examples of patents showing weighing apparatus with gravity discharge are found in the following patents:

| 2,008,305 | Johnson | July 16, 1935 |
| 3,129,779 | Clements | Apr. 21, 1964 |
| 3,139,271 | Claussen | June 30, 1964 |

A disadvantage of discharging into the side of a mixer is the additional mixing time required and the difficulty of obtaining a uniform mix. To overcome this problem, pressure injection into a mixer has been proposed in the art. Typically it involves pumping asphalt and using a flow meter. In addition to the expensive pumping equipment involved, such an approach did not lend itself readily to automation. Another approach has been to weigh in one bucket, dump to another, and pump from the other. Again, the equipment involved is expensive, and maintenance problems are inherent in such apparatus. The present invention is directed toward overcoming these and other problems of prior art equipment.

SUMMARY OF THE INVENTION

Described briefly, in a typical embodiment of the present invention, a container mounted on an asphalt tower through a weighing mechanism, is provided with a normally-closed outlet and a normally-open inlet valve. An asphalt supply pipe is disposed at the inlet for filing the container until the desired weight of material is contained. Then the asphalt is required in the mix cycle and the inlet and outlet valves are simultaneously closed and opened, respectively, whereupon air pressure is applied to the container for discharge of the asphalt therefrom through spray nozzles spaced along a spray bar mounted to the container and disposed over the centerline of the asphalt and aggregate batch mixer.

BRIEF DESCRIPTION OF THE DRAWINGS

The full nature of the invention will be understood from the accompanying drawings and the following description and claims.

FIG. 2 is a top plan view thereof.

FIG. 4 is a much enlarged elevational view with a section therethrough taken at line 4—4 in FIG. 2 and viewed in the direction of the arrows.

DESCRIPTION OF THE PREFERRED EMBODIMENT

Figure 1:
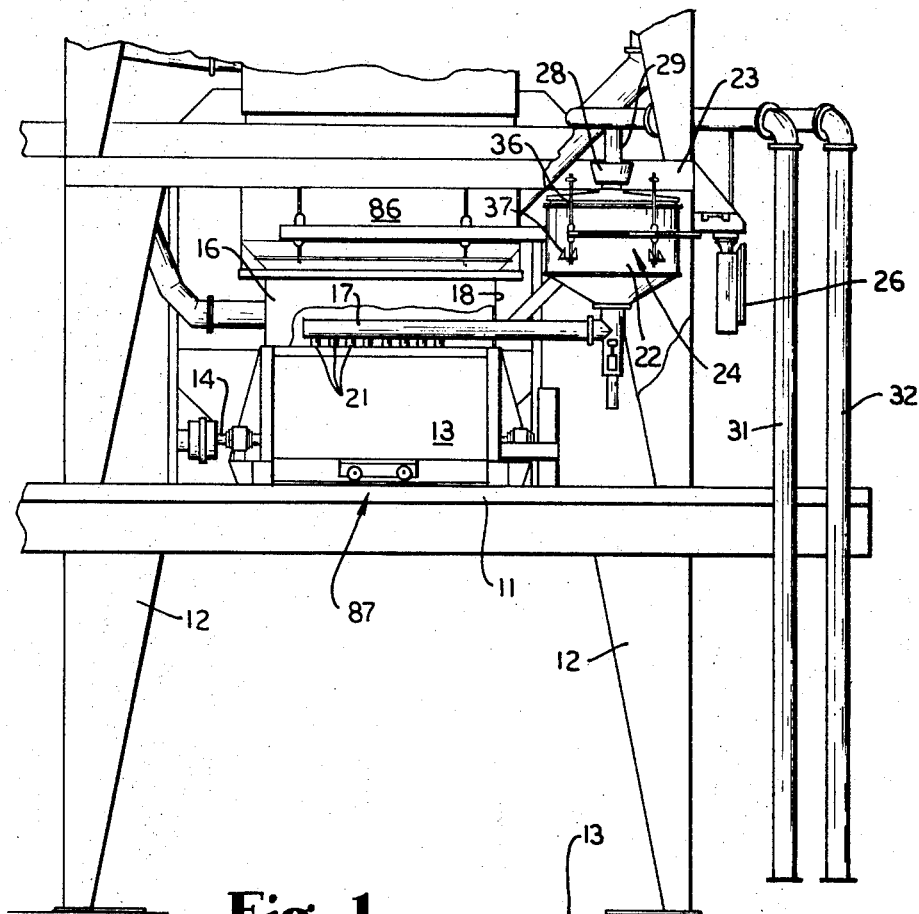
FIG. 1 is an elevational view of a portion of an asphalt plant tower with the apparatus of the present invention incorporated therein.

Referring now to the drawings in detail, and particularly FIG. 1, a portion of an asphalt batch mix plant tower is shown with the work platform 11 supported by legs 12 based on the ground 13. An asphalt-aggregate batch mixer 13, which may be of the twin-shaft pugmill type, for example, is mounted on the work platform 11 and driven by input shaft 14. A shroud 16 above the mixer receives a spray bar 17 through the shroud end 18. As shown in FIG. 2, this spray bar is over the longitudinal centerline 19 of the mixer so that the plurality of nozzles 21 spaced along the bottom of the bar are directed into the aggregate in the mixer along the centerline thereof. As shown in the broken away portion of the shroud in FIG. 1, the spray bar extends virtually the entire length of the mixer. Consequently an even distribution and thorough asphalt penetration are obtained.

An asphalt-weighing and discharge container is provided in the form of a tank 22 supported by the tower structure 23 through a weighing mechanism 24 provided with an indicator dial 26 and pointer 27. The scale mechanism itself is conventional and well-known in the art.

A container inlet cone 28 is centrally located under a fill pipe 29 connected through a manifold to a pair of asphalt supply pipes 31 and 32 through which asphalt is pumped upwardly from storage at ground level. Although a single pipe might be used, the pair of pipes permits a supply of several types of asphaltic material simultaneously into the discharge pipe 29.

Figure 3:
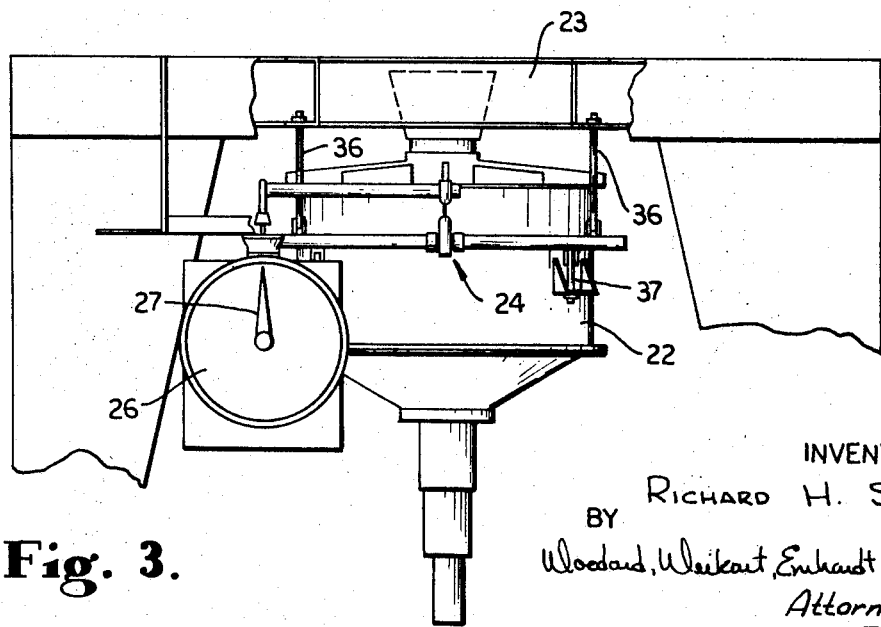
FIG. 3 is a right side elevational view of the asphalt-weighing container and scale assembly, on a larger scale.

Referring now more particularly to FIG. 3, comparison thereof with FIGS. 1 and 2 reveals that the tank in the illustrated embodiment is generally cylindrical and the scale mechanism 24 is supported on the tower structure 23 by four hanger bolts 36. The tank is supported on the weighing mechanism by four hanger bolts 37. The tank may have a capacity of around 180 gallons, in one example, and details of the tank itself will be better understood upon reference to FIG. 4.

Referring now to FIG. 4, the tank 22 has a double wall and conical bottom providing the spaces 38 and 39 for circulation of hot oil to maintain the desired temperature in the tank. This hot oil is supplied by a system typically employed in batch mix plants, and not a part of the present invention. A cover 41 is secured to the tank by a series of bolts and has a plurality of radial ribs 42 thereon. An internally threaded coupler 43 is mounted on the cover and receives the externally threaded cylindrical member 44 to which the inlet cone 28 is secured. The inlet cone does not contact the fill pipe 29 at any time, the former being mounted to the tank, and the latter being immovably secured to the tower structure. In addition to serving as the mount for the inlet cone, the member 44 has a conical lower face 46 thereon which serves as an inlet valve seat. The threaded mounting of the coupler to the cover permits axial adjustment of the valve seat.

The inlet valve in the illustrated embodiment includes a valve base 47, a valve member 48, typically made of "Teflon," and a retainer 49. The seat and retainer are threadedly received at the upper end of a valve bar or shaft 51 having its axis colinear with the cylindrical axis 52 of the tank, and so located by the cylindrical upper shaft guide 53 including the guide bracket 54 secured to the tank and the cylindrical lining 56 mounted therein and which may also be of "Teflon."

While the inlet valve is normally-open as shown, the tank is also provided with an outlet valve which is normally-closed. The outlet valve is of virtually identical construction to the inlet valve, including a base 57, a retainer 58, both threadedly received on a connecting rod 59, and a seal member 61, typically made of "Teflon." The valve seal member is seated on the conical surface 62 of the cylindrical lower valve seat member 63 secured to the discharge chamber 64. This chamber is also of a jacketed construction providing a passage for heated oil at 66. The flange 67 on the member 64 receives the mating flange of the spray bar 17 which has also a jacketed type of construction.

The connecting rod 59 is threadedly connected to the valve shaft 51 and has a coupler 68 affixed to the lower end thereof which is internally threaded and threadedly received on the piston rod 69 of the air cylinder 71. This air cylinder is affixed to the lower end of the valve actuator mounting bracket 72 which is affixed to the lower end of the discharge chamber member 64. Packing 73 is provided around the connecting rod 59 at the lower end of the discharge chamber and the force of its engagement on the connecting rod is determined by the adjustment of the packing gland 74, secured to the housing 76 by capscrews 77.

A liquid level indicator 78 is mounted to the cover and is provided with a probe 79 extending down into the container to avoid overfilling, by sending out an appropriate control signal. Also mounted to the cover is an air supply pipe 81 supplied with air through appropriate supply line 82 connected to a source designated schematically and on a much smaller scale in FIG. 4 at 83. This source is normally not mounted to the container or tank, but instead is either secured to the tower or disposed at ground level. This source should be understood to be a source of comparatively high volume and low pressure with means for adjustment of pressure and volume applied therefrom to the inlet pipe 81 of the tank 22. Varieties of conventional apparatus are known which can be employed for this purpose. An example is a positive displacement blower of the Roots type, with a speed control for pressure and volume variation. Another example is an air compressor discharging into an accumulator of large volume with an adjustable discharge, Such equipment is known so a description in more detail would be superfluous. The objective according to a typical embodiment of the present invention is to apply air pressure to the tank 22 when the inlet valve is closed, in order to discharge the asphalt therefrom under pressure through the spray bar and out the spray nozzles into the mixer. It is desirable to have the capacity to discharge the entire contents of the container when filled completely with asphalt, within a period of less than 6 to 10 seconds.

OPERATION

In the operation of the apparatus, aggregate is dumped from a weigh batcher 86 (FIG. 1) into the mixer 13. Meanwhile the air cylinder 71 has closed the lower valve in the tank 22 and with the tank empty, the scale reading is set to zero. Hot asphalt is discharged into the tank from one or both of the supply pipes 31 through the fill pipe 29 until the desired weight of asphalt is in the tank as indicated by the pointer on the scale. Then the air cylinder is operated to shift the valves, closing the inlet and opening the outlet. Simultaneously therewith air is applied from the source through the pipe 81 driving the asphalt from the tank through the discharge housing and spray bar onto the aggregate in the mixer. After a mixing operation of a suitable length, it is discharged from the mixer through one or more of the doors 87 into a truck.

In addition to the advantages of simplicity and reliability of operation, the present invention enables accurate measurement of the amount of asphalt to be added to the mixer regardless of temperature and viscosity. It also enables the discharge rate to be adjusted by simply adjusting the air pressure applied. It should be understood that the weight of the air supply hoses and of the heating oil hoses as well as the spray bar are accounted for in the initial setting of the scale and do not interfere with accurate measurements. Because the spray bar is affixed to the bucket 22, it must be free to move vertically in the shroud 18, as the tank 22 moves vertically, during the filling and emptying of the tank, to avoid interference with accurate weighing of the asphalt. Normally the actuation of the air cylinder 71 to shift the valve shaft 51 upwardly, and the introduction of air into the tank 22 through pipe 81, are caused by a signal operating a solenoid controlled valve for each, such as indicated at 85 in FIG. 4, for example.

While the invention has been disclosed and described in some detail in the drawings and foregoing description, they are to be considered as illustrative and not restrictive in character, as other modifications may readily suggest themselves to person skilled in this art and within the broad scope of the invention, reference being made to the appended claims.

I claim:
1. The combination comprising:
a container;
inlet and outlet valves on said container;
a distribution tube mounted to said container and communicating with said container through said outlet valve;
weighing means supporting said container;
a valve shaft; and
portions of said inlet and outlet valves being mounted to said shaft for simultaneous closing of an inlet and opening of an outlet.

2. The combination comprising:
a container;
inlet and outlet valves on said container;
a distribution tube mounted to said container and communicating with said container through said outlet valve;
weighing means supporting said container;
a valve shaft;
portions of said inlet and outlet valves being mounted to said shaft for simultaneous closing of an inlet and opening of an outlet; and
a ram secured to the bottom of said container and having a piston rod connected to said valve shaft for linear movement of said shaft, and thereby said valves, for said simultaneous closing and opening events.

3. The combination of claim 2 and further comprising:
an axially adjustable coupling between said valve shaft and said piston rod for proper closing of said outlet valve,
and an axially adjustable mounting of a portion of said inlet valve to said container for proper closing of said inlet valve simultaneous with opening of said outlet valve.

4. The combination of claim 2 and further comprising:
a distribution tube communicating with said container;
a mixer associated with said tube for receiving asphaltic material from said tube and mixing with aggregate;
an asphaltic liquid supply line having discharge means associated with said inlet, for discharge into said container when said inlet valve is open, said supply line and said mixer being disposed and arranged to avoid interference thereof with vertical movement of said container and said tube during weighing thereof by said weighing means.

5. The combination comprising:
a container for holding asphaltic material;
weighing means supporting said container;
a weigh batcher for holding aggregate material;
a distribution tube with discharge outlets communicating with said container;
a mixer for receiving said asphaltic material from said tube and said aggregate material from said weigh batcher, said mixer having a centerline with said outlets spaced therealong, said mixer disposed and arranged to avoid interference thereof with vertical movement of said container and said tube during weighing thereof by said weighing means.